(12) United States Patent
Saebo

(10) Patent No.: US 12,081,639 B1
(45) Date of Patent: Sep. 3, 2024

(54) SYSTEMS AND METHODS FOR PRE-PROCESSING STRING DATA FOR NETWORK TRANSMISSION

(71) Applicant: Pathogenomix, Inc., Santa Cruz, CA (US)

(72) Inventor: Oystein Friestad Saebo, Santa Cruz, CA (US)

(73) Assignee: Pathogenomix, Inc., Santa Cruz, CA (US)

( * ) Notice: Subject to any disclaimer, the term of this patent is extended or adjusted under 35 U.S.C. 154(b) by 0 days.

(21) Appl. No.: 18/319,008

(22) Filed: May 17, 2023

(51) Int. Cl.
*H04L 69/04* (2022.01)

(52) U.S. Cl.
CPC .................... *H04L 69/04* (2013.01)

(58) Field of Classification Search
None
See application file for complete search history.

(56) References Cited

U.S. PATENT DOCUMENTS

| | | | | |
|---|---|---|---|---|
| 10,089,360 B2* | 10/2018 | Narasimha | ........ | G06F 16/24568 |
| 11,473,137 B2* | 10/2022 | Yang | ...................... | G16H 50/20 |
| 2020/0401695 A1* | 12/2020 | Mayo | .................... | G06F 21/564 |
| 2021/0263976 A1* | 8/2021 | Dupont | ............... | G06F 16/9014 |
| 2023/0039723 A1* | 2/2023 | Ichikawa | ............... | H04L 9/3236 |

FOREIGN PATENT DOCUMENTS

| | | | | |
|---|---|---|---|---|
| CN | 107119129 A | * | 9/2017 | ........... C12Q 1/6858 |
| CN | 116769948 A | * | 9/2023 | |
| WO | WO-2022134807 A1 | * | 6/2022 | ............... C12Q 1/68 |

* cited by examiner

*Primary Examiner* — Mohammed Rachedine
(74) *Attorney, Agent, or Firm* — Foley & Lardner LLP

(57) ABSTRACT

Systems and methods for pre-processing string data for network transmission are disclosed. A system can extract first sequences from a sequence file and generate respective encoded sequences based on the first sequences extracted from the sequence file. The system can generate a hash table that stores the respective encoded sequences. The system can combine at least two entries in the hash table based on a comparison of data generated from at least two of the respective plurality of encoded sequences. The system can transmit an output file including a plurality of decoded sequences generated based on the hash table.

10 Claims, 3 Drawing Sheets

SYSTEMS AND METHODS FOR PRE-PROCESSING STRING DATA FOR NETWORK TRANSMISSION

BACKGROUND

String data may be transmitted between computing systems in a networked computing environment. Although compression techniques can be utilized to reduce the size of data transmitted via a network, such compression techniques are often not suitable for very large string files.

SUMMARY

The systems and methods described herein enable fast and secure transmission of information by efficiently reducing the size of string data to be transmitted using a variety of pre-processing techniques. The techniques described herein can be utilized to significantly reduce the size of files to be transmitted via networks that include several millions of strings having a regular structure, for example. Rather than a 75% reduction in size, which may be common with certain compression techniques, the pre-processing techniques described herein can be utilized to reduce the size of string data to be transmitted by a factor of 1000 to 1, significantly reducing the network resources required to transmit the string data.

At least one aspect of the present disclosure is directed to a system. The system includes one or more processors coupled to memory. The system can extract a plurality of first sequences from a sequence file. The system can generate a respective plurality of encoded sequences based on the plurality of first sequences extracted from the sequence file. The system can generate a hash table that stores the respective plurality of encoded sequences. The system can combine at least two entries in the hash table based on a comparison of data generated from at least two of the respective plurality of encoded sequences. The system can transmit an output file including a plurality of decoded sequences generated based on the hash table.

In some implementations, the system can extract the plurality of first sequences by performing operations comprising identifying a respective primer for a sequence of the plurality of first sequences in the sequence file; and extracting the sequence based on the respective primer. In some implementations, the system can determine that one primer was identified for the sequence of the plurality of first sequences; and increment a counter corresponding to partial primer coverage for the sequence file.

In some implementations, the respective primer is a respective forward primer. In some implementations, the system can extract the plurality of first sequences by performing operations comprising identifying a corresponding reverse primer for the sequence of the plurality of first sequences in the sequence file; and extracting the sequence based on the forward primer and the corresponding reverse primer. In some implementations, the system can increment a counter corresponding to full primer coverage for the sequence file.

In some implementations, the respective plurality of encoded sequences are run-length encodings (RLE) of the plurality of first sequences. In some implementations, the system can combine the at least two entries in the hash table by performing operations comprising determining that at least two RLE sequences of the respective plurality of encoded sequences match; calculating, for each base of the at least two RLE sequences, a respective average of the RLE counters of the at least two RLE sequences; and combining the at least two RLE sequences in the hash table. In some implementations, the system can combine the at least two entries in the hash table by performing operations comprising ranking the plurality of first sequences according to a respective copy number of each of the plurality of first sequences.

In some implementations, the system can combine the at least two entries in the hash table by performing operations comprising calculating a first distance based on at least two encoded sequences of the respective plurality of encoded sequences; and clustering the at least two encoded sequences responsive to the first distance satisfying a first threshold to generate a first cluster including the at least two encoded sequences.

In some implementations, the system can calculate the first distance based on the at least two encoded sequences by performing operations comprising generating respective decoded versions of the at least two encoded sequences based on averaged RLE counts of each base for the at least two encoded sequences; and calculating the first distance between the respective decoded versions of the at least two encoded sequences. In some implementations, the system can remove an encoded sequence from the first cluster; and calculate a second distance between a decoded version of the encoded sequence and a second decoded version of a second encoded sequence of the respective plurality of encoded sequences.

In some implementations, the output file has a smaller file size compared to the sequence file. In some implementations, the sequence file has a predetermined file format. In some implementations, the system can generate the output file by converting the respective plurality of encoded sequences in the hash table to the predetermined file format.

At least one other aspect of the present disclosure is directed to a method. The method may be performed by one or more processors coupled to memory, for example. The method includes extracting a plurality of first sequences from a sequence file. The method includes generating a respective plurality of encoded sequences based on the plurality of first sequences extracted from the sequence file. The method includes generating a hash table that stores the respective plurality of encoded sequences. The method includes combining at least two entries in the hash table based on a comparison of data generated from at least two of the respective plurality of encoded sequences. The method includes transmitting an output file including a plurality of decoded sequences generated based on the hash table.

In some implementations, extracting the plurality of first sequences comprises identifying a respective primer for a sequence of the plurality of first sequences in the sequence file; and extracting the sequence based on the respective primer. In some implementations, the method includes determining that one primer was identified for the sequence of the plurality of first sequences; and incrementing a counter corresponding to partial primer coverage for the sequence file.

In some implementations, the respective primer is a respective forward primer. In some implementations, extracting the plurality of first sequences comprises identifying a corresponding reverse primer for the sequence of the plurality of first sequences in the sequence file; and extracting the sequence based on the forward primer and the corresponding reverse primer. In some implementations, the method includes incrementing a counter corresponding to full primer coverage for the sequence file.

In some implementations, the respective plurality of encoded sequences are RLEs of the plurality of first sequences. In some implementations, combining the at least two entries in the hash table comprises determining that at least two RLE sequences of the respective plurality of encoded sequences match; calculating, by the one or more processors, for each base of the at least two RLE sequences, a respective average of the RLE counters of the at least two RLE sequences; and combining the at least two RLE sequences in the hash table.

In some implementations, combining the at least two entries in the hash table comprises ranking the plurality of first sequences according to a respective copy number of each of the plurality of first sequences. In some implementations, combining the at least two entries in the hash table comprises calculating a first distance based on at least two encoded sequences of the respective plurality of encoded sequences; and clustering the at least two encoded sequences responsive to the first distance satisfying a first threshold to generate a first cluster including the at least two encoded sequences.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the present disclosure can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using suitable apparatus, which may take the form of programmable computers running computer programs arranged to implement the aspect. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to and implementations of techniques, approaches, methods, apparatuses, and systems for pre-processing string data for network transmission. The various concepts introduced above and discussed in detail below may be implemented in any of numerous ways, as the described concepts are not limited to any particular manner of implementation. Examples of specific implementations and applications are provided primarily for illustrative purposes.

Large string files, such as files that include gigabytes worth of information, may be challenging to transmit on computer networks due to their size and the processing limitations of network infrastructure. Networks have limited bandwidth, which can create bottlenecks and slow down the transmission of large files. As the file size of string files increases, the amount of time taken to transmit the file in the network also increases, potentially causing congestion on the network and reducing the available bandwidth for other computing devices and applications. Increased latency in transmitting such large files can cause delays in data transmission and affect overall network performance.

Although compression algorithms may be utilized to reduce the size of transmitted files, conventional compression techniques are often only capable of reducing file sizes by 75% at best. With large, multi-gigabyte files, this degree of reduction may not be enough to eliminate the aforementioned network issues relating to the transmission of large string files. To address these and other issues, the systems and methods described herein provide techniques to reduce large sequence files including large numbers of strings by a factor of 1000 to 1. Such techniques may be applied, for example, to files that include string data with many similar and repeating characters.

The techniques described herein provide a "sequence read aware" model to organize an upload package that maintains resolution and specificity while providing 1000 to 1 reduction in the size of the upload package for a given sequence file. The techniques described herein therefore eliminate instances of lengthy file uploads, reducing overall network consumption and eliminating the resource requirements to store large files among multiple computing devices. One example use case for the present techniques includes pre-processing deoxyribonucleic acid (DNA) or ribonucleic acid (RNA) sequence data, which may include sequence data that is several gigabytes in size. The systems and methods described herein may be implemented in a cloud-based system, which may access sequence files and generate corresponding pre-processed files as described herein.

Figure 1:
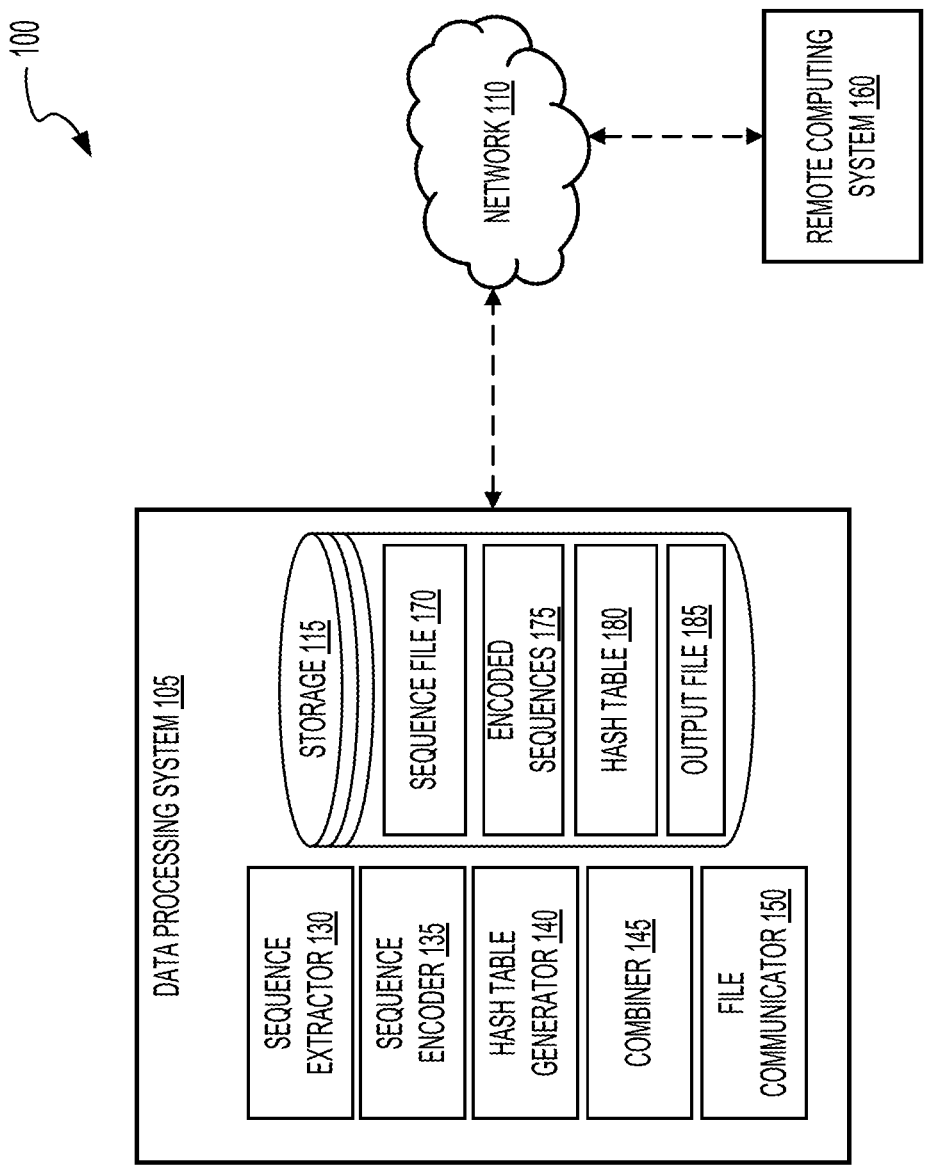
FIG. 1 illustrates an example system for pre-processing string data for network transmission, in accordance with one or more implementations.

Referring to FIG. 1, illustrated is a block diagram of an example system 100 for pre-processing string data for network transmission, in accordance with one or more implementations. The system 100 can include at least one data processing system 105, at least one network 110, and at least one remote computing system 160. The data processing system 105 can include a sequence extractor 130, a sequence encoder 135, a hash table generator 140, a combiner 145, a file communicator 150, and storage 115. The storage 115 can include one or more sequence files 170, one or more encoded sequences 175, one or more hash tables 180, and one or more output files 185. Although shown here as internal to the data processing system 105, the storage 115 can be external to the data processing system 105, for example, as a part of a local storage repository.

Each component (e.g., the data processing system 105, the network 110, the remote computing system 160, the sequence extractor 130, the sequence encoder 135, the hash table generator 140, the combiner 145, the file communicator 150, the storage 115, etc.) of the system 100 can be implemented using the hardware components or a combination of software with the hardware components of a computing system, such as the computing system 300 described in connection with FIG. 3, or any other computing system described herein. Each component of the data processing system 105 can perform the functionalities detailed herein.

The data processing system 105 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), etc., or combinations thereof. The memory (which may be or include the storage 115) may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein. The data processing system 105 can include any or all of the components and perform any or all of the functions of the computer system 300 described in connection with FIG. 3.

In some implementations, the data processing system 105 may communicate with the remote computing system 160, for example, to receive sequence files 170 or to provide generated output files 185, which may include pre-processed string data generated using the techniques described herein. In one example, the data processing system 105 can be or include an application server or webserver, which may include software modules to access or transmit stored by the data processing system 105 (e.g., in the storage 115). For example, the data processing system 105 may include a webserver or a cloud computing system that provides one or more interfaces (e.g., web-based interfaces, APIs, etc.) that enable the remote computing system 160 to request generation of one or more output files 185 for a corresponding sequence file 170. In response, the data processing system 105 can perform the techniques described herein to generate the corresponding output file 185 for the sequence file 170 designated in the request and transmit the output file 185 to the remote computing system 160. In some implementations, the data processing system 105 can transmit data to the remote computing system 160 in response to user input by an operator of the data processing system 105.

The network 110 can include computer networks such as the Internet, local, wide, or other area networks, intranets, and satellite networks, other computer networks such as voice or data mobile phone communication networks, or combinations thereof. The data processing system 105 of the system 100 can communicate via the network 110 with one or more computing devices, such as the remote computing system 160. The network 110 may be any form of computer network that can relay information between the data processing system 105 and the remote computing system 160. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive or transmit data within the network 110.

The network 110 may further include any number of hardwired or wireless connections. Any or all of the computing devices described herein (e.g., the data processing system 105, the remote computing system 160, the computer system 300, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 110. Any or all of the computing devices described herein (e.g., the data processing system 105, the remote computing system 160, the computer system 300, etc.) may also communicate wirelessly with the computing devices of the network 110 via a proxy device (e.g., a router, network switch, or gateway).

The remote computing system 160 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code generated from any suitable computer programming language. The remote computing system 160 can include one or more computing devices, servers, personal computing devices, or data repositories. The remote computing system 160 can include any or all of the components and perform any or all of the functions of the computer system 300 described in connection with FIG. 3. The remote computing system 160 may be a cloud computing system or any other type of computing system that is external to the data processing system 105.

The storage 115 can be a computer-readable memory that can store or maintain any of the information described herein. The storage 115 can store or maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. In implementations where the storage 115 is external to the data processing system 105, the storage 115 can be accessed by the components of the data processing system 105 via the network 110 or via a local communications interface. The storage 115 can be distributed across many different computer systems or storage elements. The data processing system 105 can store, in one or more regions of the memory of the data processing system 105, or in the storage 115, the results of any or all computations, determinations, selections, identifications, generations, constructions, or calculations in one or more data structures indexed or identified with appropriate values.

Any or all values stored in the storage 115 may be accessed by the components of the data processing system 105 to perform any of the functionalities or functions described herein. In some implementations, the data processing system 105 may utilize authentication information (e.g., username, password, email, etc.) to show that an operator of the data processing system 105 is authorized to access requested information in the storage 115. The storage 115 may include permission settings that indicate which users, devices, or profiles are authorized to access certain information stored in the storage 115.

The storage 115 can store one or more sequence files 170, for example, in one or more data structures or file systems. The sequence files 170 can include any type of file that stores strings (including encoded or compressed strings). For example, the sequence files 170 may include any type of genetic sequence file, such as FASTQ, FASTQ.GZ, FASTA, FSTA, binary alignment map (BAM) and FNA, among others. The FASTQ format is a text-based format for storing both a biological sequence (usually a nucleotide sequence) and its corresponding quality scores. In some implementations, the sequence letter and quality score may each be encoded with one or more characters (e.g., ASCII characters, etc.) for brevity. The FASTQ.GZ format may be a zipped file that includes a FASTQ file.

The FASTA format can be a text-based format for representing either nucleotide sequences or amino acid (protein) sequences, in which nucleotides or amino acids are represented using single-letter codes. The FASTA format allows for sequence names and comments to precede the sequences. The BAM format includes comprehensive raw data of genome sequencing. A BAM format file can include the lossless, compressed binary representation of one or more sequence alignment map (SAM) files. The BAM format is therefore a compressed binary representation of the SAM format. The SAM format is a compact and index-able representation of nucleotide sequence alignments. Indexing is used to retrieve alignments that overlap a specific location quickly. Files having the BAM format may be sorted first by reference identifier and then by leftmost coordinate.

The sequence files 170 may include any number of genetic sequences, and may include one or more primers (e.g., reverse primers, forward primers, etc.) that may identify different sequence reads in the sequence file 170. The sequence file 170 may be stored in association with an identifier of a sample, and may be identified, retrieved, and processed by the components of the data processing system 105 in response to a corresponding request from the remote computing system 160. In some implementations, the sequence files 170 may be received from one or more external systems (e.g., a sequencing system, the remote computing system 160, etc.) via the network 110 and stored in the storage 115 for later processing.

The storage 115 can store one or more encoded sequences 175, for example, in one or more data structures. Using the techniques described herein, the components of the data processing system 105 can extract sequences from a sequence file 170, and generate a corresponding encoded sequence 175 for each extracted sequence. The encoded sequence 175 may be a run-length encoding of the corresponding extracted sequence. Run-length encoding is a form of lossless data compression in which runs of data (e.g., sequences in which the same data value occurs in many consecutive data elements) are stored as a single data value and respective count, rather than as the original run. Run-length encoding is efficient on data that contains many runs with common consecutive data values, including genetic sequence data.

The storage 115 can store one or more hash tables 180, for example, in one or more data structures or files. The hash table 180 can be generated from the one or more encoded sequences 175, as described herein. Utilizing the hash table 180 to store representations of the encoded sequences 175 improves the overall computational efficiency of the techniques described herein. The hash table 180 can be a data structure that implements a set abstract data type and can map keys to values. The hash table 180 can be populated by using a hash function to compute an index (e.g., a hash code) into an array of buckets or slots, from which the desired value can be found. During lookup, the key is hashed and the resulting hash indicates where the corresponding value is stored. The use of the hash table 180 can improve computational efficiency when combining or clustering sequences according to the techniques described herein.

The storage 115 can store one or more output files 185, for example, in one or more data structures. The output files 185 can be generated using the techniques described herein, and subsequently transmitted by the components of the data processing system 105 to a requesting remote computing system 160. In some implementations, the data processing system 105 may be computing system that is utilized to capture or process one or more sequence files 170, generate corresponding output files 185, and upload said output files 185 to one or more cloud computing systems (e.g., the remote computing system 160). The output files 185 may include decoded sequences, counts, and other data generated based on the techniques described herein. For example, the output files 185 may include one or more clusters, the total number of reads in each cluster, the total number of reads of the largest sequence of each cluster, as well as decoded sequences in each cluster generated according to the techniques described herein, among other data. The output files 185 may be uploaded to the remote computing system 160 via one or more suitable APIs, web addresses, or transfer protocols. The output files 185 may be smaller in size than the corresponding sequence file 170.

Referring now to the operations of the components of the data processing system 105, the sequence extractor 130 can extract a set of sequences from a sequence file 170. The sequence file 170 may be generated by components of the data processing system 105, or may be received by the data processing system 105 from another computing system via the network 110 or via a suitable communications interface. As described herein, the sequence file 170 may be any file that includes string data, such as genetic sequence data. The sequence file 170 may be stored in any suitable format, including any of FASTQ, FASTQ.GZ, FASTA, FSTA, BAM, and FNA, among others. Although the following examples describe the extraction of sequences from a sequence file 170 having a FASTQ format, it should be understood that similar techniques may be utilized to extract sequences from any type of file to achieve useful results.

The sequence extractor 130 may extract sequences from a sequence file 170 identified via user input or via a request received from another computing device in communication with the data processing system 105. To extract the sequences from the sequence file 170, the sequence extractor 130 can iterate through the sequence file 170 line by line and extract the lines containing sequence information. The sequence information may be sequence data corresponding to DNA sequences, RNA sequences, protein sequences, or other types of sequences. The sequence file 170 may include or may be stored in association with any data relating to the sequence information, including settings, primer data, barcodes, and cutoff thresholds, among other information. The sequence extractor 130 can access and process any data included in or stored in association with the sequence file 170 to extract the one or more sequences.

In an example where the sequence file 170 is a FASTQ sequence file 170, every fourth line may include a sequence that is paired with another line including quality scores for each base. The sequence extractor 130 can access the sequence information by reading the sequence and quality numbers into memory. For each extracted sequence, the sequence extractor 130 can compute a respective average quality value. The sequence extractor 130 can compute the sum of the quality scores for all positions in the sequence, and then divide the sum by the length of the sequence to calculate the average quality value. In some implementations, the sequence extractor 130 may remove a sequence from processing if the average quality value falls below a predetermined threshold. The predetermined threshold may be stored as part of the settings for processing the sequence file 170, and may be specified via user input or via a request from another computing system, for example.

The sequence extractor 130 may extract sequences corresponding to predetermined barcodes. Barcodes may also be referred to as indexes or adapters. Barcodes may be utilized to tag sequence fragments from different samples so that they can be pooled together and sequenced in a single next generation sequencing (NGS) run. Barcodes can be utilized to identify which reads belong to which sample, such that the samples may be analyzed separately, even if they are mixed in the same sequencing run. The sequence extractor 130 may extract sequences using a demultiplexing technique, in which reads can be separated or processed separately based on their barcodes. Upon detecting a barcode in a sequence, the sequence extractor 130 may store the sequence in association with an identifier of the barcode and may increment a counter corresponding to a barcode match for that barcode. The barcodes may be stored as a part of the settings file for processing the respective sequence file 170.

The sequence extractor 130 may determine whether a sequence is greater than or equal to a sequence length threshold set in the settings. In some implementations, the sequence extractor 130 can discard sequences that do not satisfy the sequence length threshold. If the sequence satisfies the length threshold and the quality threshold indicated in the settings, the sequence extractor 130 can increment a counter corresponding to "good" sequences extracted from the sequence file 170. If the sequence does not satisfy the length threshold and the quality threshold, the sequence may be discarded, and the sequence extractor 130 may iterate to the next sequence in the sample.

In some implementations, the sequence extractor 130 can identify and trim sequence information based on one or more primers. The primers may be specified in the sequence file 170 or in the settings stored in association with the sequence file 170. To do so, the sequence extractor 130 can use the primers as pairs, generate extra primer set sequences as reverse inversions of the original sequence, or generate all combinations of all primer sequence pairs. For each primer sequence pair, the sequence extractor 130 can trim the input sequence with the forward primer by removing the portion of the sequence matching the forward primer. Once the forward primer has been trimmed, the sequence extractor 130 can attempt to trim the sequence using the corresponding reverse primer. The sequence can be marked (e.g., by storing a flag in association with the sequence) if both primers are found. If the reverse primer is found, reverse primer can be trimmed from the sequence by removing the portion of the sequence matching the reverse primer. The length of the trimmed sequence may be then stored in association with the respective trimmed sequence.

When all primer combinations have been used for trimming of the sequence (and in some cases, multiple sequences may be extracted or identified from a line of the sequence file 170), the longest trimmed input sequence is extracted by the sequence extractor 130 for the line of the sequence file 170. If an input sequence was successfully trimmed with both primer sequences in a primer sequence pair, a counter corresponding to full primer coverage for the sequence file 170 can be incremented, and the trimmed sequence can be utilized in the further processing operations described herein. If one primer sequence was used to trim the sequence information, a counter corresponding to partial primer coverage for the sequence file 170 can be incremented, and the trimmed sequence can be utilized in the further processing operations described herein. If no primer sequence could be utilized to trim the sequence, and a setting to use reads with no primer is set to true in the settings for processing the sequence file 170, the sequence extractor 130 can increment a counter corresponding to no primer coverage for the sequence file 170, and the untrimmed sequence can be utilized in the further processing operations described herein. Otherwise, if the setting to use reads with no primer is set to false, the sequence may be discarded and the sequence extractor 130 can iterate to the next sequence in the sequence file 170.

The sequence encoder 135 can generate respective encoded sequences 175 based on the set of sequences extracted from the sequence file 170 by the sequence extractor 130. The encoded sequences 175 can be run-length encodings of the set of sequences extracted from the sequence file 170. To generate the encoded sequences 175, the sequence encoder 135 can perform an RLE process for each extracted sequence. The RLE process can include replacing repeated values in the sequence with a count and a single instance of that value. For example, the value AAAABBBCCDAAA can be reduced to ABCDA, with count values 4, 3, 2, 1 3. To generate an encoded sequence 175 using an input sequence, sequence encoder 135 can scan through the data in each sequences to identify consecutive bases or portions having the same value, which may be referred to as "runs." Each run is then replaced by a pair of values, which includes the number of consecutive occurrences of the value, and the value itself. This pair of values is called a run-length pair.

The encoded sequences 175 may be represented by two corresponding values, with one value indicating the respective values for each run, and the second value including a sequence of integers that represent the count of each run value. Furthering the example above, the string representing the run values may be represented as ABCDA, and the second value representing the counts may be stored as 43213. Both values may be stored in a data structure as a single encoded sequence 175. The sequence encoder 135 may iterate through and generate an encoded sequence 175 for each sequence extracted from the sequence file 170 by the sequence extractor 130. The encoded sequences 175 may be stored as a sequence and count array pair. Following generation, the encoded sequences 175 may be added to a hash table 180 generated for the sequence file 170.

The hash table generator 140 can generate a hash table 180 that stores the respective encoded sequences 175. The hash table 180 may be generated according to a set of predetermined parameters, which may specify the hash function utilized, the number of buckets in the hash table 180, as well as other hash table 180 parameters. In some implementations, if one or more hash table 180 parameters are missing from the settings for processing the sequence file 170, a set of default hash table 180 parameters can be utilized. If a hash table 180 has not yet been generated for the sequence file 170, the hash table generator 140 can generate an empty hash table 180 for the sequence file 170.

To add an encoded sequence 175 to the hash table 180, the hash table generator 140 can utilize the RLE sequence data of the encoded sequence 175 as a key value. The hash table generator 140 can calculate the hash value of the RLE sequence using a hash function. The hash function takes the key as input and produces a unique integer value that represents the index in the hash table 180 where the corresponding value will be stored. The hash table generator 140 can then check whether the index calculated by the hash function is already present in the hash table 180. If the index is not occupied, the encoded sequence 175 (e.g., the array including the RLE sequence and corresponding counts) can be stored in the hash table 180 at the calculated index. If the index is occupied, the hash table generator 140 can increment a counter for the respective hash table 180 index to indicate that a second RLE sequence having the same RLE sequence value (but not necessarily the same RLE sequence counts) is present in the hash table 180. The corresponding counts for the matching RLE sequence can then be appended to a data structure stored at that location in the hash table 180. The keys for the hash table 180 (e.g., the RLE sequence data) therefore points to a list of corresponding RLE counter data arrays that are stored in the hash table 180.

The hash table generator 140 can repeat this process for each encoded sequence 175 generated by the sequence encoder 135 to populate the hash table 180. Each encoded sequence 175 key added to the hash table 180 can be stored in a list for further processing. The respective counter for each RLE sequence which is incremented each time a matching key value (e.g., an identical RLE sequence value of an encoded sequence 175) was added to the hash table 180 may be referred to herein as a "copy number," indicating the number of copies of an RLE sequence that were added to the hash table 180. The copy number may be utilized in further processing steps to remove entries from the hash table 180 if the copy number does not satisfy a corresponding threshold stored in the settings for processing the corresponding sequence file 170.

The combiner 145 can process the hash table 180 by combining at least two entries in the hash table 180 based on a comparison of data generated from at least two of the respective plurality of encoded sequences 175 that are stored in the hash table 180. To do so, the combiner 145 can first identify each key that has been added to the hash table 180 and sort the keys according to an alphabetical order (where each key is a unique RLE sequence added to the hash table 180 without the counters for the base values). The combiner 145 can then iterate through each key in the list of keys to combine entries in the hash table 180. To do so, the combiner 145 may determine whether the current key of the current iteration completely overlaps (e.g., matches in the entirety of the first key) the next key in the list. In some implementations, the overlap may be a complete overlap (e.g., both the current and next key completely match). In some implementations, the overlap may be a partial overlap. If there is a match (e.g., an overlap), the combiner 145 can combine the keys into a single RLE sequence by utilizing the larger of the two matching sequences as the RLE sequence key, summing the count (e.g., the copy number) of each sequence into a combined copy number, and computing an average of each RLE count per base. The average of each RLE count per base can then be added with the RLE sequence to the hash table 180, thereby replacing the keys utilized to generate the combined sequence. If the combiner 145 determines that the current and next keys do not overlap, the combiner 145 can maintain the current key (and associated counter and RLE base counters) in the hash table 180. This process can be repeated for each RLE sequence key in the list.

Once the combiner 145 has iterated through each RLE sequence key in the list, the combiner 145 can remove sequences from the hash table 180 that do not satisfy a copy number threshold. To do so, the combiner 145 can iterate through each of the RLE sequences in the hash table 180, and retrieve the corresponding copy number associated with each RLE sequence. The combiner 145 can then compare the corresponding copy number to the copy number threshold to determine whether the corresponding copy number is greater than or equal to the copy number threshold. If the corresponding copy number is greater than or equal to the copy number threshold, the combiner 145 can iterate to the next RLE sequence. If the corresponding copy number is less than the copy number threshold, the combiner 145 can remove the RLE sequence (and any data associated therewith) from the hash table 180. The copy number threshold may be stored in association with the settings for processing the corresponding sequence file 170.

The combiner 145 can then perform a first pass of a Levenshtein comparison between the encoded sequences 175 that remain in the hash table 180. To do so, the combiner 145 can first retrieve all of the encoded sequences 175 from the hash table 180 and the copy numbers associated therewith and generate a list of the encoded sequences 175. The list can be sorted according to the copy number in a descending order, such that the sequences having a greater copy number are at the top of the list, and sequences having a lower copy number are at the bottom of the list. The combiner 145 can then generate a matrix that stores the Levenshtein distances between each sequence in the list.

The Levenshtein distances can be computed based on a decoded form of the encoded sequences 175. Because combined encoded sequences 175 in the hash table 180 may have one or more decimal (e.g., non-integer) base counter values (e.g., due to the above-described averaging process, etc.), the combiner 145 can perform a rounding process to generate integer values used to generate corresponding decoded consensus sequences. The rounding process may be performed according to a ⅘ down/up rounding rule. For example, if a base counter value has a value of 3.2, the rounded value will result in 3, and if a base counter value has a value of 3.5, the rounded value will result in 4. The decoded version of each encoded sequence 175 can be computed by reversing the RLE encoding according to the rounded version of the base counter values.

The Levenshtein distance is a measure of the difference between two strings (e.g., the decoded RLE sequences). The Levenshtein distance may correspond to the minimum number of operations (insertions, deletions, or substitutions) required to transform one string into the other. The combiner 145 can iterate through each current encoded sequence 175 in the list, and compute the Levenshtein distance between the decoded form of the current encoded sequence 175 and each other encoded sequence 175 in the list. The resulting Levenshtein distance values can be stored in the generated matrix. Once the Levenshtein distances have been generated for all combinations of the encoded sequences 175, the combiner 145 can generate one or more initial clusters for the encoded sequences 175.

To do so, the combiner 145 can iterate through the list of encoded sequences 175 (starting with the sequence having the greatest copy number) and compare each Levenshtein distance computed for the encoded sequence 175 selected for the current iteration with a maximum cluster variation threshold. The maximum cluster variation threshold may be stored as part of the settings for processing the input sequence file 170. The encoded sequence 175 of the current iteration can be added to a cluster, and if the Levenshtein distances between the decoded versions of the encoded sequence 175 of the current iteration and other encoded sequences 175 of the list satisfy (e.g., are less than, are less than or equal to, etc.) the maximum cluster variation threshold, those other encoded sequences 175 can be removed from the list and added to the cluster for the current iteration. After iterating through each Levenshtein distance for the encoded sequence 175 of the current iteration, the combiner 145 can iterate to the next remaining encoded sequence 175 in the list, if any. This process can be repeated for each encoded sequence 175 in the list, until all encoded sequences 175 have been added to a corresponding cluster. Each cluster may be associated with a respective cluster number, which indicates the order in which the cluster was generated (e.g., the first cluster may have a cluster number of one, the second cluster may have a cluster number of two, etc.).

Once all of the encoded sequences 175 have been added to corresponding clusters (each of which may include one or more encoded sequences 175), the combiner 145 may perform an additional Levenshtein comparison process. To do so, the combiner 145 can sort each of the clusters and the underlying encoded sequences 175 by cluster number, Levenshtein distance, and count. The clusters can be sorted by cluster number, and the encoded sequences 175 associated with each cluster can be sorted by Levenshtein distance and count (e.g., copy number). The combiner 145 can iterate through each cluster and identify the main encoded sequence 175 corresponding to the cluster. The main encoded sequence 175 can be the first encoded sequence 175 added to the cluster (e.g., having the greatest copy number and a Levenshtein distance of zero).

The combiner 145 can then iterate through each other encoded sequence 175, if any, in the cluster starting from the next largest copy number. For each encoded sequence 175 iteration in the current cluster, the combiner 145 can determine whether the Levenshtein distance from the main encoded sequence 175 is greater than 0, and whether the Levenshtein distance between the decoded form of the current encoded sequence 175 and the decoded form of the encoded sequence 175 of the previous iteration (e.g., the previous encoded sequence 175 in the list) is greater than twice the count (e.g., the copy number) of the encoded sequence 175 of the previous iteration. If so, the combiner 145 can remove the current encoded sequence 175 from the current cluster and insert the removed encoded cluster into a separate list for further processing. This process can be repeated for each encoded sequence 175 in each cluster, resulting in a set of clusters and a list of removed encoded sequences 175. The combiner 145 can then repeat the Levenshtein distance processing approach described above to generate one or more additional clusters, which may be included in the set of clusters. This can include sorting the list of removed encoded sequences 175 by copy number, generating a matrix including Levenshtein distances between each encoded sequence 175 in the list, and generating clusters for the removed encoded sequences 175.

Once the set of clusters has been generated by the combiner 145, the file communicator 150 can generate and transmit an output file 185 including decoded sequences generated based on the hash table 180. The output file 185 may have a smaller file size compared to the sequence file 170 used to generate the output file 185. To generate the output file 185, the file communicator 150 can iterate through all of the clusters and sum the copy numbers of all encoded sequences 175 of each cluster. Additionally, the file communicator 150 can calculate the total number of reads in each cluster and the total number of reads for the largest encoded sequence 175 in each cluster. For each cluster, the file communicator 150 can generate a decoded sequence using the reverse RLE process described herein.

To do so, the file communicator 150 can identify the largest encoded sequence in each cluster (e.g., the encoded sequence having the largest copy number). The file communicator 150 can then perform a reverse RLE process, as described herein, on the identified largest encoded sequence, and include the decoded version of said sequence in the output file 185. The file communicator 150 can further include the cluster number, the number of reads for the largest encoded sequence in each cluster, the number of reads in each cluster, a number of reads utilized after copy number threshold removal, and the total number of reads, into the output file 185. Each decoded sequence can be stored in association with the values generated for each cluster. Each decoded sequence (and any values associated therewith) can be inserted into an output file 185.

In some implementations, to generate an output file 185, the file communicator 150 can perform multiple sequence alignment may be performed for all sequences in each cluster. For example, the file communicator 150 may be utilize the MUSCLE algorithm or another suitable approach to multiple sequence alignment. The multiple sequence alignment process can be performed on the encoded sequences in each cluster to generate an encoded consensus sequence for each cluster. The consensus sequence can then be decoded using the reverse RLE process described herein. The decoded consensus sequence is utilized as the dominant sequence for that cluster, and can be inserted into the output file 185 as described herein.

The file communicator 150 may convert the decoded sequences into a different file format when inserting the information into the output file 185. In some implementations, the output file 185 may have the same file format as the input sequence file 170. Once the output file 185 has been generated, the file communicator 150 can transmit the output file 185 to one or more computing systems via the network. In some implementations, the file communicator 150 can transmit the output file 185 to the remote computing system. The file communicator 150 may transmit the output file 185 using one or more APIs of the remote computing system or a suitable communication protocol (e.g., the secure file transfer protocol (FTPS), etc.).

Figure 2:
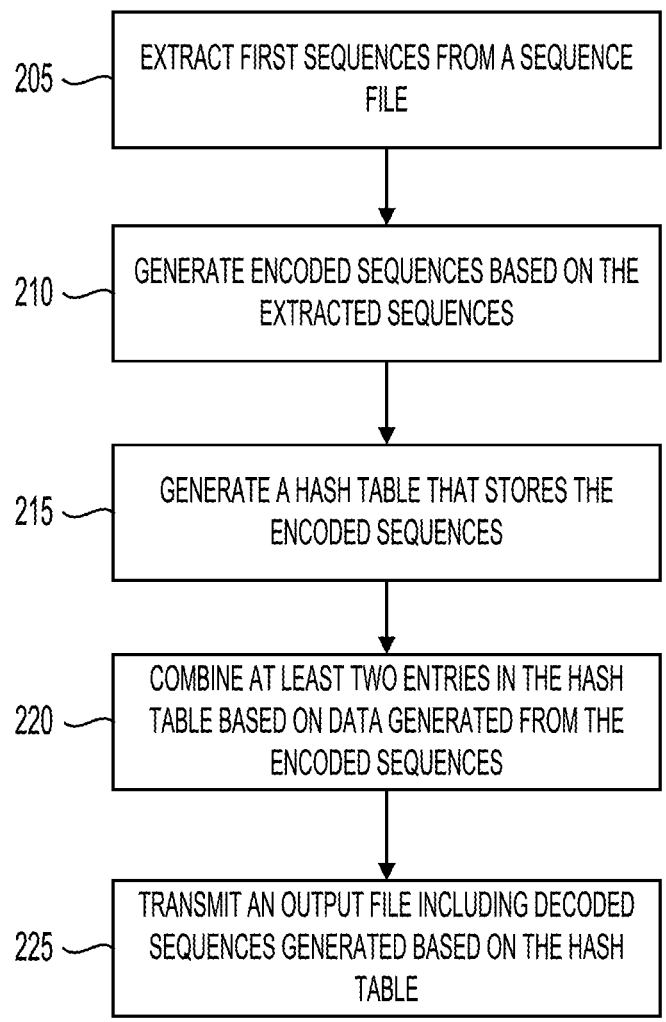
FIG. 2 illustrates a flow chart of an example method for pre-processing string data for network transmission, in accordance with one or more implementations.

FIG. 2 illustrates a flow chart of an example method 200 for pre-processing string data for network transmission, in accordance with one or more implementations. The method 200 can be performed, for example, by a data processing system (e.g., the data processing system 105), or any computing devices described herein (e.g., the computer system 300 of FIG. 3). It should be understood that the method 200 shown in FIG. 2 is an example, and that additional steps may be performed, steps may be omitted, or steps may be performed in a different order than shown to achieve desired results.

At act 205 of the method 200, the data processing system (e.g., the data processing system 105) can extract one or more first sequences from a sequence file (e.g., the sequence file 170). As described herein, the sequence file may be any file that includes string data, such as genetic sequence data. The sequence file may be stored in any suitable format, including any of FASTQ, FASTQ.GZ, FASTA, FSTA, BAM, and FNA, among others. Although the following examples describe the extraction of sequences from a sequence file having a FASTQ format, it should be understood that similar techniques may be utilized to extract sequences from any type of file to achieve useful results.

The data processing system may extract sequences from a sequence file identified via user input or via a request received from another computing device in communication with the data processing system. To extract the sequences from the sequence file, the data processing system can iterate through the sequence file line by line and extract the lines containing sequence information. The sequence information may be sequence data corresponding to DNA sequences, RNA sequences, protein sequences, or other types of sequences. The sequence file may include or may be stored in association with any data relating to the sequence information, including settings, primer data, barcodes, and cutoff thresholds, among other information. The data processing system can access and process any data included in or stored in association with the sequence file to extract the one or more sequences.

In an example where the sequence file is a FASTQ sequence file, every fourth line may include a sequence that is paired with another line including quality scores for each base. The data processing system can access the sequence information by reading the sequence and quality numbers into memory. For each extracted sequence, the data processing system can compute a respective average quality value. The data processing system can compute the sum of the quality scores for all positions in the sequence, and then divide the sum by the length of the sequence to calculate the average quality value. In some implementations, the data processing system may remove a sequence from processing if the average quality value falls below a predetermined threshold. The predetermined threshold may be stored as part of the settings for processing the sequence file and may be specified via user input or via a request from another computing system, for example.

The data processing system may extract sequences corresponding to predetermined barcodes. Barcodes may also be referred to as indexes or adapters. Barcodes may be utilized to tag sequence fragments from different samples so that they can be pooled together and sequenced in a single NGS run. Barcodes can be utilized to identify which reads belong to which sample, such that the samples may be analyzed separately, even if they are mixed in the same sequencing run. The data processing system may extract sequences using a demultiplexing technique, in which reads can be separated or processed separately based on their barcodes. Upon detecting a barcode in a sequence, the data processing system may store the sequence in association with an identifier of the barcode and increment a counter corresponding to a barcode match for that barcode. The barcodes may be stored as a part of the settings file for processing the respective sequence file.

The data processing system may determine whether a sequence is greater than or equal to a sequence length threshold set in the settings. In some implementations, the data processing system can discard sequences that do not satisfy the sequence length threshold. If the sequence satisfies the length threshold and the quality threshold indicated in the settings, the data processing system can increment a counter corresponding to "good" sequences extracted from the sequence file. If the sequence does not satisfy the length threshold and the quality threshold, the sequence may be discarded, and the data processing system may iterate to the next sequence in the sample.

In some implementations, the data processing system can identify and trim sequence information based on one or more primers. The primers may be specified in the sequence file or in the settings stored in association with the sequence file. To do so, the data processing system can use the primers as pairs, generate extra primer set sequences as reverse inversion of the original sequence, or generate all combinations of all primer sequence pairs. For each primer sequence pair, the data processing system can trim the input sequence with the forward primer by removing the portion of the sequence matching the forward primer. Once the forward primer has been trimmed, the data processing system can attempt to trim the sequence using the corresponding reverse primer. The sequence can be marked (e.g., by storing a flag in association with the sequence) if both primers are found. If the reverse primer is found, reverse primer can be trimmed from the sequence by removing the portion of the sequence matching the reverse primer. The length of the trimmed sequence may be then stored in association with the respective trimmed sequence.

When all primer combinations have been used for trimming of the sequence (and in some cases, multiple sequences may be extracted or identified from a line of the sequence file), the longest trimmed input sequence is extracted by the data processing system for the line of the sequence file. If an input sequence was successfully trimmed with both primer sequences in a primer sequence pair, a counter corresponding to full primer coverage for the sequence file can be incremented, and the trimmed sequence can be utilized in the further processing operations described herein. If one primer sequence was used to trim the sequence information, a counter corresponding to partial primer coverage for the sequence file can be incremented, and the trimmed sequence can be utilized in the further processing operations described herein. If no primer sequence could be utilized to trim the sequence, and a setting to use reads with no primer is set to true in the settings for processing the sequence file, the data processing system can increment a counter corresponding to no primer coverage for the sequence file, and the untrimmed sequence can be utilized in the further processing operations described herein. Otherwise, if the setting to use reads with no primer is set to false, the sequence may be discarded and the data processing system can iterate to the next sequence in the sequence file.

At act 210 of the method 200, the data processing system can generate one or more encoded sequences (e.g., the encoded sequences 175) based on the sequences extracted from the sequence file. The encoded sequences can be run-length encodings of the set of sequences extracted from the sequence file. To generate the encoded sequences, the data processing system can perform an RLE process for each extracted sequence. The RLE process can include replacing repeated values in the sequence with a count and a single instance of that value. To generate an encoded sequence using an input sequence, data processing system can scan through the data in each sequences to identify consecutive bases or portions having the same value. Each run is then replaced by a pair of values, which includes the number of consecutive occurrences of the value, and the value itself. This pair of values is called a run-length pair.

The encoded sequences may be represented by two corresponding values, with one value indicating the respective values for each run, and the second value including a sequence of integers that represent the count of each run value. Both values may be stored in a data structure as a single encoded sequence. The data processing system may iterate through and generate an encoded sequence for each sequence extracted from the sequence file by the data processing system. The encoded sequences may be stored as a sequence and count array pair. Following generation, the encoded sequences may be added to a hash table generated for the sequence file in act 215 of the method 200.

At act 215 of the method 200, the data processing system can generate a hash table (e.g., the hash table 180) that stores the encoded sequences generated in act 210. The hash table may be generated according to a set of predetermined parameters, which may specify the hash function utilized, the number of buckets in the hash table, as well as other hash table parameters. In some implementations, if one or more hash table parameters are missing from the settings for processing the sequence file, a set of default hash table parameters can be utilized. If a hash table has not yet been generated for the sequence file, the data processing system can generate an empty hash table for the sequence file.

To add an encoded sequence to the hash table, the data processing system can utilize the RLE sequence data of the encoded sequence as a key value. The data processing system can calculate the hash value of the RLE sequence using a hash function. The hash function takes the key as input and produces a unique integer value that represents the index in the hash table where the corresponding value will be stored. The hash table generator can then check whether the index calculated by the hash function is already present in the hash table. If the index is not occupied, the encoded sequence (e.g., the array including the RLE sequence and corresponding counts) can be stored in the hash table at the calculated index. If the index is occupied, the data processing system can increment a counter for the respective hash table index to indicate that a second RLE sequence having the same RLE sequence value (but not necessarily the same RLE sequence counts) is present in the hash table. The corresponding counts for the matching RLE sequence can then be appended to a data structure stored at that location in the hash table. The keys for the hash table (e.g., the RLE sequence data) therefore points to a list of corresponding RLE counter data arrays that are stored in the hash table.

The data processing system can repeat this process for each encoded sequence generated by the sequence encoder, to populate the hash table. Each encoded sequence key added to the hash table can be stored in a list for further processing. The respective counter for each RLE sequence which is incremented each time a matching key value (e.g., an identical RLE sequence value of an encoded sequence) was added to the hash table may be referred to herein as a "copy number," indicating the number of copies of an RLE sequence that were added to the hash table. The copy number may be utilized in further processing steps to remove entries from the hash table if the copy number does not satisfy a corresponding threshold stored in the settings for processing the corresponding sequence file.

At act 220 of the method 200, the data processing system can combine at least two entries in the hash table based on data generated from the encoded sequences. To do so, the data processing system can first identify each key that has been added to the hash table, and sort the keys according to an alphabetical order (where each key is a unique RLE sequence added to the hash table without the counters for the base values). The data processing system can then iterate through each key in the list of keys to combine entries in the hash table. To do so, the data processing system may determine whether the current key of the current iteration completely overlaps (e.g., matches in the entirety of the first key) the next key in the list. In some implementations, the overlap may be a complete overlap (e.g., both the current and next key completely match). In some implementations, the overlap may be a partial overlap. If there is a match (e.g., an overlap), the data processing system can combine the keys into a single RLE sequence by utilizing the larger of the two matching sequences as the RLE sequence key, summing the count (e.g., the copy number) of each sequence into a combined copy number, and computing an average of each RLE count per base. The average of each RLE count per base can then be added with the RLE sequence to the hash table, thereby replacing the keys utilized to generate the combined sequence. If the data processing system determines that the current and next keys do not overlap, the data processing system can maintain the current key (and associated counter and RLE base counters) in the hash table. This process can be repeated for each RLE sequence key in the list.

Once the data processing system has iterated through each RLE sequence key in the list, the data processing system can remove sequences from the hash table that do not satisfy a copy number threshold. To do so, the data processing system can iterate through each of the RLE sequences in the hash table, and retrieve the corresponding copy number associated with each RLE sequence. The data processing system can then compare the corresponding copy number to the copy number threshold to determine whether the corresponding copy number is greater than or equal to the copy number threshold. If the corresponding copy number is greater than or equal to the copy number threshold, the data processing system can iterate to the next RLE sequence. If the corresponding copy number is less than the copy number threshold, the data processing system can remove the RLE sequence (and any data associated therewith) from the hash table. The copy number threshold may be stored in association with the settings for processing the corresponding sequence file.

The data processing system can then perform a first pass of a Levenshtein comparison between the encoded sequences that remain in the hash table. To do so, the data processing system can first retrieve all of the encoded sequences from the hash table and the copy numbers associated therewith, and generate a list of the encoded sequences. The list can be sorted according to the copy number in a descending order, such that the sequences having a greater copy number are at the top of the list, and sequences having a lower copy number are at the bottom of the list. The data processing system can then generate a matrix that stores the Levenshtein distances between each sequence in the list.

The Levenshtein distances can be computed based on a decoded form of the encoded sequences. Because combined encoded sequences in the hash table may have one or more decimal (e.g., non-integer) base counter values (e.g., due to the above-described averaging process, etc.), the data processing system can perform a rounding process to generate integer values used to generate corresponding decoded consensus sequences. The rounding process may be performed according to a ⅘ down/up rounding rule, as described herein. The decoded version of each encoded sequence can be computed by reversing the RLE encoding according to the rounded version of the base counter values. The data processing system can iterate through each current encoded sequence in the list, and compute the Levenshtein distance between the decoded form of the current encoded sequence and each other encoded sequence in the list. The resulting Levenshtein distance values can be stored in the generated matrix. Once the Levenshtein distances have been generated for all combinations of the encoded sequences, the data processing system can generate one or more initial clusters for the encoded sequences.

To do so, the data processing system can iterate through the list of encoded sequences (starting with the sequence having the greatest copy number) and compare Levenshtein distance computed for the encoded sequence selected for the current iteration with a maximum cluster variation threshold. The maximum cluster variation threshold may be stored as part of the settings for processing the input sequence file. The encoded sequence of the current iteration can be added to a cluster, and if the Levenshtein distances between the decoded versions of the encoded sequence of the current iteration and other encoded sequences of the list satisfy (e.g., are less than, are less than or equal to, etc.) the maximum cluster variation threshold, those other encoded sequences can be removed from the list and added to the cluster for the current iteration. After iterating through each Levenshtein distance for the encoded sequence of the current iteration, the data processing system can iterate to the next remaining encoded sequence in the list, if any. This process can be repeated for each encoded sequence in the list, until all encoded sequences have been added to a corresponding cluster. Each cluster may be associated with a respective cluster number, which indicates the order in which the cluster was generated (e.g., the first cluster may have a cluster number of one, the second cluster may have a cluster number of two, etc.).

Once all of the encoded sequences have been added to corresponding clusters (each of which may include one or more encoded sequences), the data processing system may perform an additional Levenshtein comparison process. To do so, the data processing system can sort each of the clusters and the underlying encoded sequences by cluster number, Levenshtein distance, and count. The clusters can be sorted by cluster number, and the encoded sequences associated with each cluster can be sorted by Levenshtein distance and count (e.g., copy number). The data processing system can iterate through each cluster and identify the main encoded sequence corresponding to the cluster. The main encoded sequence can be the first encoded sequence added to the cluster (e.g., having the greatest copy number and a Levenshtein distance of zero).

The data processing system can then iterate through each other encoded sequence, if any, in the cluster starting from the next largest copy number. For each encoded sequence iteration in the current cluster, the data processing system can determine whether the Levenshtein distance from the main encoded sequence is greater than 0 and whether the Levenshtein distance between the decoded form of the current encoded sequence and the decoded form of the encoded sequence of the previous iteration (e.g., the previous encoded sequence in the list) is greater than twice the count (e.g., the copy number) of the encoded sequence of the previous iteration. If so, the data processing system can remove the current encoded sequence from the current cluster, and insert the removed encoded cluster into a separate list for further processing. This process can be repeated for each encoded sequence in each cluster, resulting in a set of clusters and a list of removed encoded sequences. The data processing system can then repeat the Levenshtein distance processing approach described above to generate one or more additional clusters, which may be included in the set of clusters. This can include sorting the list of removed encoded sequences by copy number, generating a matrix including Levenshtein distances between each encoded sequence in the list, and generating clusters for the removed encoded sequences.

At act 225 of the method 200, the data processing system can transmit an output file (e.g., the output file) including decoded sequences generated based on the hash table. The output file may have a smaller file size compared to the sequence file used to generate the output file. To generate the output file, the data processing system can iterate through all of the clusters and sum the copy numbers of all encoded sequences of each cluster. Additionally, the data processing system can calculate the total number of reads in each cluster and the total number of reads for the largest encoded sequence in each cluster. For each cluster, the data processing system can generate a decoded sequence using the reverse RLE process described herein. Each decoded sequence can be stored in association with the values generated for each cluster. Each decoded sequence (and any values associated therewith) can be inserted into an output file.

The data processing system may convert the decoded sequences into a different file format when inserting the information into the output file. In some implementations, the output file may have the same file format as the input sequence file. Once the output file has been generated, the data processing system can transmit the output file to one or more computing systems via the network. In some implementations, the data processing system can transmit the output file to a remote computing system (e.g., the remote computing system 160). The data processing system may transmit the output file using one or more APIs of the remote computing system or a suitable communication protocol.

Figure 3:
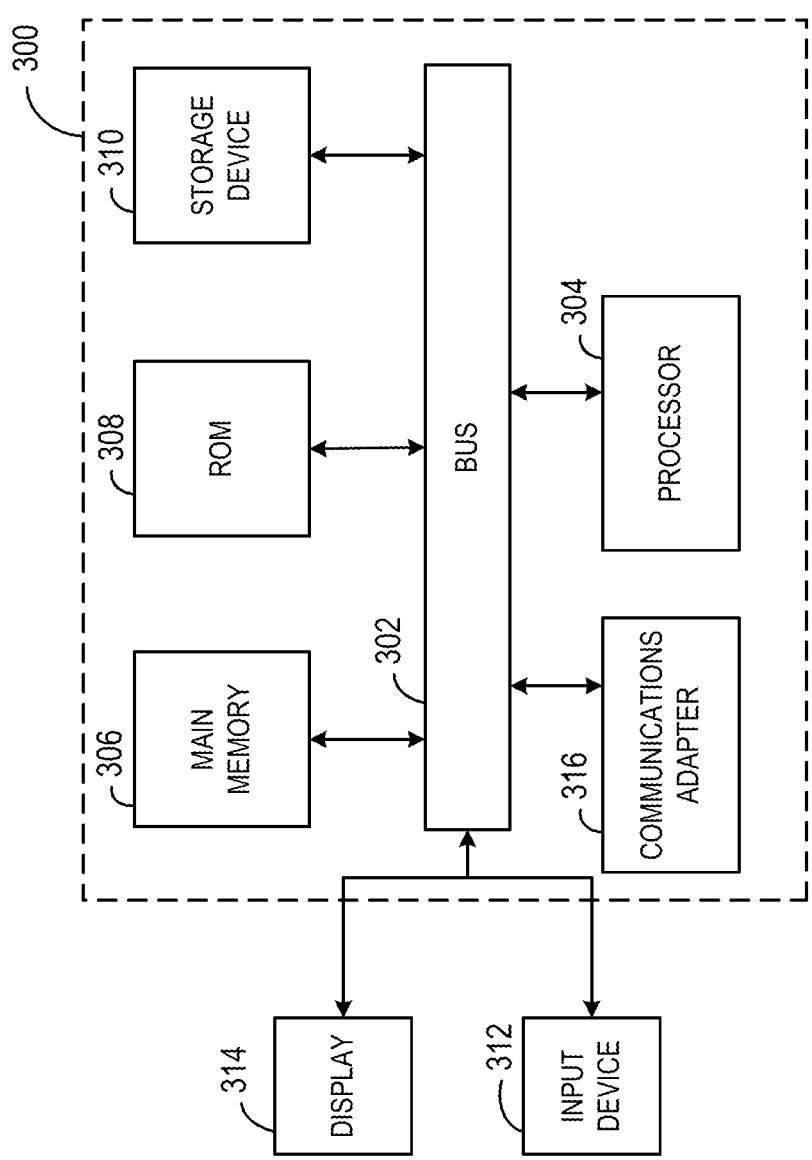
FIG. 3 illustrates a block diagram of an example computing system suitable for use in the various arrangements described herein, in accordance with one or more implementations.

FIG. 3 is a component diagram of an example computing system suitable for use in the various implementations described herein, according to an example implementation. For example, the computing system 300 may implement the data processing system 105 or the remote computing system 160 of FIG. 1, or various other example systems and devices described in the present disclosure.

The computing system 300 includes a bus 302 or other communication component for communicating information and a processor 304 coupled to the bus 302 for processing information. The computing system 300 also includes main memory 306, such as a RAM or other dynamic storage device, coupled to the bus 302 for storing information, and instructions to be executed by the processor 304. Main memory 306 can also be used for storing position information, temporary variables, or other intermediate information during execution of instructions by the processor 304. The computing system 300 may further include a ROM 308 or other static storage device coupled to the bus 302 for storing static information and instructions for the processor 304. A storage device 310, such as a solid-state device, magnetic disk, or optical disk, is coupled to the bus 302 for persistently storing information and instructions.

The computing system 300 may be coupled via the bus 302 to a display 314, such as a liquid crystal display, or active matrix display, for displaying information to a user. An input device 312, such as a keyboard including alphanumeric and other keys, may be coupled to the bus 302 for communicating information, and command selections to the processor 304. In another implementation, the input device 312 has a touch screen display. The input device 312 can include any type of biometric sensor, or a cursor control, such as a mouse, a trackball, or cursor direction keys, for communicating direction information and command selections to the processor 304 and for controlling cursor movement on the display 314.

In some implementations, the computing system 300 may include a communications adapter 316, such as a networking adapter. Communications adapter 316 may be coupled to bus 302 and may be configured to enable communications with a computing or communications network or other computing systems. In various illustrative implementations, any type of networking configuration may be achieved using communications adapter 316, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 300 in response to the processor 304 executing an implementation of instructions contained in main memory 306. Such instructions can be read into main memory 306 from another computer-readable medium, such as the storage device 310. Execution of the implementation of instructions contained in main memory 306 causes the computing system 300 to perform the illustrative processes described herein. One or more processors in a multi-processing implementation may also be employed to execute the instructions contained in main memory 306. In alternative implementations, hard-wired circuitry may be used in place of or in combination with software instructions to implement illustrative implementations. Thus, implementations are not limited to any specific combination of hardware circuitry and software.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that, although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What is claimed is:

1. A system, comprising:
one or more processors coupled to memory, the one or more processors configured to:
extract a plurality of first sequences from a sequence file;
generate a respective plurality of encoded sequences based on the plurality of first sequences extracted from the sequence file, wherein the respective plurality of encoded sequences are run-length encodings (RLE) of the plurality of first sequences;

generate a hash table that stores the respective plurality of encoded sequences;

combine at least two entries in the hash table based on a comparison of data generated from at least two of the respective plurality of encoded sequences, wherein combining the at least two entries comprises determining that at least two RLE sequences of the respective plurality of encoded sequences match;

calculating, for each base of the at least two RLE sequences, a respective average of RLE counters of the at least two RLE sequences; and combining the at least two RLE sequences in the hash table; and transmit an output file including a plurality of decoded sequences generated based on the hash table.

2. The system of claim 1, wherein the one or more processors are further configured to extract the plurality of first sequences by performing operations comprising:

identifying a respective primer for a sequence of the plurality of first sequences in the sequence file; and extracting the sequence based on the respective primer.

3. The system of claim 2, wherein the one or more processors are further configured to:

determine that one primer was identified for the sequence of the plurality of first sequences; and increment a counter corresponding to partial primer coverage for the sequence file.

4. The system of claim 2, wherein the respective primer is a respective forward primer, and the one or more processors are further configured to extract the plurality of first sequences by performing operations comprising:

identifying a corresponding reverse primer for the sequence of the plurality of first sequences in the sequence file; and extracting the sequence based on the forward primer and the corresponding reverse primer.

5. The system of claim 4, wherein the one or more processors are further configured to increment a counter corresponding to full primer coverage for the sequence file.

6. A method, comprising:

extracting, by one or more processors coupled to non-transitory memory, a plurality of first sequences from a sequence file;

generating, by the one or more processors, a respective plurality of encoded sequences based on the plurality of first sequences extracted from the sequence file, wherein the respective plurality of encoded sequences are run-length encodings (RLE) of the plurality of first sequences;

generating, by the one or more processors, a hash table that stores the respective plurality of encoded sequences;

combining, by the one or more processors, at least two entries in the hash table based on a comparison of data generated from at least two of the respective plurality of encoded sequences, wherein combining the at least two entries comprises determining that at least two RLE sequences of the respective plurality of encoded sequences match;

calculating, for each base of the at least two RLE sequences, a respective average of RLE counters of the at least two RLE sequences; and combining the at least two RLE sequences in the hash table; and transmitting, by the one or more processors, an output file including a plurality of decoded sequences generated based on the hash table.

7. The method of claim 6, wherein extracting the plurality of first sequences comprises:

identifying, by the one or more processors, a respective primer for a sequence of the plurality of first sequences in the sequence file; and extracting, by the one or more processors, the sequence based on the respective primer.

8. The method of claim 7, further comprising:

determining, by the one or more processors, that one primer was identified for the sequence of the plurality of first sequences; and incrementing, by the one or more processors, a counter corresponding to partial primer coverage for the sequence file.

9. The method of claim 7, wherein the respective primer is a respective forward primer, and wherein extracting the plurality of first sequences comprises:

identifying, by the one or more processors, a corresponding reverse primer for the sequence of the plurality of first sequences in the sequence file; and extracting, by the one or more processors, the sequence based on the forward primer and the corresponding reverse primer.

10. The method of claim 9, further comprising incrementing, by the one or more processors, a counter corresponding to full primer coverage for the sequence file.

* * * * *